United States Patent
Wang

(10) Patent No.: US 9,832,281 B2
(45) Date of Patent: Nov. 28, 2017

(54) METHOD, DEVICE AND SYSTEM FOR CARRYING OUT TELECOMMUNICATION CAPABILITY GROUP SENDING

(71) Applicant: ZTE CORPORATION, Shenzhen, Guangdong Province (CN)

(72) Inventor: Yeke Wang, Shenzhen (CN)

(73) Assignee: Xi'an Zhongxing New Software Co., Ltd., Xi'An (CN)

( * ) Notice: Subject to any disclaimer, the term of this patent is extended or adjusted under 35 U.S.C. 154(b) by 17 days.

(21) Appl. No.: 14/907,580

(22) PCT Filed: Jun. 11, 2014

(86) PCT No.: PCT/CN2014/079682
§ 371 (c)(1),
(2) Date: Jan. 26, 2016

(87) PCT Pub. No.: WO2014/173366
PCT Pub. Date: Oct. 30, 2014

(65) Prior Publication Data
US 2016/0182678 A1    Jun. 23, 2016

(30) Foreign Application Priority Data

Jul. 26, 2013 (CN) .......................... 2013 1 0319465

(51) Int. Cl.
G06F 17/30 (2006.01)
H04L 29/08 (2006.01)
H04L 12/24 (2006.01)
H04L 29/14 (2006.01)
H04W 4/12 (2009.01)

(52) U.S. Cl.
CPC ........ *H04L 67/32* (2013.01); *G06F 17/30598* (2013.01); *G06F 17/30864* (2013.01);
(Continued)

(58) Field of Classification Search
CPC .............. G06F 17/30; G06F 17/30598; G06F 17/30864; G06F 17/30637
(Continued)

(56) References Cited

U.S. PATENT DOCUMENTS 6,868,439 B2    3/2005 Basu et al.
2005/0251556 A1    11/2005 Ginis et al.
(Continued)

FOREIGN PATENT DOCUMENTS

CN    1468010 A    1/2004
CN    101031107 A    9/2007
(Continued)

OTHER PUBLICATIONS

English description dated Jan. 14, 2004 of corresponding document CN1468010 A.
(Continued)

*Primary Examiner* — Isaac M Woo
(74) *Attorney, Agent, or Firm* — Plumsea Law Group, LLC

(57) ABSTRACT

A method, device and system for carrying out telecommunication capability group sending is provided, each node of a system for carrying out telecommunication capability group sending corresponds to a database service node, a plurality of database service nodes perform load balancing or switching on failure within themselves and each node of the system for carrying out telecommunication capability group sending may quickly read the subscription relationships and send down messages to users. The above technical solution increases the database access speed and avoids the problem of database's resources shortage and improves service performance of the telecommunication capability group sending.

9 Claims, 2 Drawing Sheets

(52) U.S. Cl.
CPC .............. *H04L 41/00* (2013.01); *H04L 67/10* (2013.01); *H04L 67/101* (2013.01); *H04L 67/1002* (2013.01); *H04L 67/1008* (2013.01); *H04L 67/1034* (2013.01); *H04L 67/325* (2013.01); *H04L 29/14* (2013.01); *H04L 67/06* (2013.01); *H04L 67/306* (2013.01); *H04W 4/12* (2013.01)

(58) Field of Classification Search
USPC .................................................. 707/600–899
See application file for complete search history.

(56) References Cited

U.S. PATENT DOCUMENTS

| | | | |
|---|---|---|---|
| 2009/0175429 | A1 | 7/2009 | Cohen et al. |
| 2010/0313250 | A1* | 12/2010 | Chow ............... G06F 17/30899 726/5 |

FOREIGN PATENT DOCUMENTS

| | | |
|---|---|---|
| CN | 101431734 A | 5/2009 |
| CN | 101686247 A | 3/2010 |
| CN | 101977362 A | 2/2011 |
| EP | 2472829 A1 | 7/2012 |
| WO | 2008116425 A1 | 10/2008 |
| WO | 2012055134 A1 | 5/2012 |

OTHER PUBLICATIONS

European Search Report dated Jun. 24, 2016 in European Patent Application No. 14788933.1.
International Search Report and Written Opinion dated Sep. 19, 2014 in PCT/CN2014/079682.

* cited by examiner

METHOD, DEVICE AND SYSTEM FOR CARRYING OUT TELECOMMUNICATION CAPABILITY GROUP SENDING

CROSS-REFERENCE TO RELATED APPLICATION(S)

This application is the U.S. National Phase application of PCT application number PCT/CN2014/079682 having a PCT filing date of Jun. 11, 2014, which claims priority of Chinese patent application 201310319465.9 filed on Jul. 26, 2013, the disclosures of which are hereby incorporated by reference.

TECHNICAL FIELD

The present document relates to the technical field of telecommunication capability group sending, and especially relates to a method, device and system for carrying out telecommunication capability group sending.

BACKGROUND OF RELATED ART

With a continuous increase of user quantity in a telecommunication capability group sending service, a large number of users need to be read everyday for the telecommunication capability group sending. In order to improve processing capability for an application platform engine, the unified service execution environment (USEE) uses multiple application clusters. A plurality of applications using the same database (e.g., oracle database) simultaneously may cause the database access bottleneck. Especially in the peak time of scheduling and sending, a plurality of applications read the subscription relationships simultaneously, which will cause the shortage of the database's resource and slow down the reading speed of subscription relationships, therefore, the message sending is seriously affected.

In order to solve the bottleneck problem of the database, the present solution is to store the subscription relationships as a system file in a disk of each application, therefore the pressure of the database is released by reading the subscription relationships in the disk. Though in this way the pressure of the database may be released to a certain extent, however, it brings about a lot of inconvenience for the management of the data. What's more, each read needs to consume a large number of physical I/O, which is a high cost for the I/O of the disk read, thus the normal operation of the telecommunication capability group sending service is affected.

SUMMARY OF THE INVENTION

The technical problem solved by the embodiments of the invention is to provide a method, device and system for carrying out telecommunication capability group sending, so as to avoid the database access bottleneck and speed up database access in the telecommunication capability group sending service.

In order to solve the aforementioned technical problem, a technical solution as follows is provided:

a method for carrying out telecommunication capability group sending, the method is applied in a system carrying out telecommunication capability group sending, and the system comprises a application cluster and a database cluster, the application cluster comprises a master control node and child nodes connected with the master control node, and the database cluster comprises a plurality of database service nodes and storage equipments connected with each database service node, and the master control node is connected with a database service node and each child node is connected with a database service node, the method comprising:

the master control node determining a telecommunication capability product of a scheduled telecommunication capability group sending service, reading, through the database service node connected with the master control node, user quantity information of the scheduled telecommunication capability product from the storage equipment connected with the database service node, and assigning group sending tasks to the master control node and each child node according to the user quantity information;

the master control node and each child node accessing, through the database service node connected with the master control node and each child node respectively, the storage equipments connected with the database service node, and reading, according to the group sending tasks of the master control node and each child node respectively, subscription relationships of the scheduled telecommunication capability product and content/content set of the subscription relationships of the scheduled telecommunication capability product respectively; and the master control node and each child node sending the subscription relationships and the content/content set read by the master control node and each child node respectively to a message center, and sending the subscription relationships and the content/content set obtained by the master control node and each child node respectively to users through the message center.

Alternatively, in the system carrying out telecommunication capability group sending, various database service nodes are connected with each other.

The method further comprising:

in the case that the database service nodes is accessing the storage equipment connected with the database service node and an exception happens, a database service node performing operation of load balancing or switching on failure with another database service node connected with the database service node.

Alternatively, the master control node and each child node accessing, through the database service node connected with the master control node and each child node respectively, the storage equipments connected with the database service node, and reading, according to the group sending tasks of the master control node and each child node respectively, subscription relationships of the scheduled telecommunication capability product and content/content set respectively, comprising:

the master control node and each child node read user information according to the group sending tasks of the master control node and each child node respectively, and the user information comprising user identification of the users who subscribe to the scheduled telecommunication capability product.

Alternatively, the user information further comprises one or more of VIP user information, white list user information and black list user information;

the master control node and each child node sending the subscription relationships and the content/content set read by the master control node and each child node respectively to a message center, comprising: the master control node and each child node determining the content/content set which is sent preferentially and/or not sent according to one or more of the VIP user information, the white list user information and the black list user information comprised in the user information, and sending the user identification and the content/content set to the message center.

Alternatively, the master control node and each child node comprise a first-level scheduling controller cache and a second-level scheduling controller cache;

the method further comprises: in the case that the master control node and each child node interact with the storage equipments, the second-level scheduling controller cache reading data from the storage equipment while the first-level scheduling controller cache reading data from the second-level scheduling controller cache.

A device for carrying out telecommunication capability group sending, the device is connected with database service nodes, and the database service nodes are connected with storage equipments, comprising: a content obtaining unit and a sending unit, wherein:

the content obtaining unit is configured to interact with the storage equipments through the database service nodes, read subscription relationships of a scheduled telecommunication capability product according to group sending tasks of the device and read content/content set of the scheduled telecommunication capability product;

the sending unit is configured to send the subscription relationships and the content/content set read by the content obtaining unit to a message center, and send the subscription relationships and the content/content set to users through the message center.

Alternatively, the device further comprises a task assignment unit, wherein:

the task assignment unit is configured to determine the telecommunication capability product of the scheduled telecommunication capability group sending service, read user quantity information of the scheduled telecommunication capability product from the storage equipments through the database service nodes, and assign group sending tasks to the device and nodes connected with the device according to the user quantity information.

Alternatively, the content obtaining unit is configured as follows to read subscription relationships of a scheduled telecommunication capability product according to group sending tasks of the device and read content/content set of the scheduled telecommunication capability product:

reading user information according to the group sending tasks of the device, the user information comprising user identification of users who subscribe to the scheduled telecommunication capability product.

The user information further comprises one or more of VIP user information, white list user information and black list user information.

The sending unit is further configured to determine the content/content set which is sent preferentially and/or not sent according to one or more of the VIP user information, the white list user information and the black list user information comprised in the user information, and send the user identification and the content/content set to the message center.

A system for carrying out telecommunication capability group sending, comprising: an application cluster and a database cluster, wherein the application cluster comprises a master control node and child nodes connected with the master control node, and the database cluster comprises a plurality of database service nodes and storage equipments connected with each database service node, the master control node is connected with a database service node and each child node is connected with a database service node, wherein:

the master control node is configured to determine a telecommunication capability product of a scheduled telecommunication capability group sending service, read, through the database service node connected with the master control node user, user quantity information of the scheduled telecommunication capability product from the storage equipment connected with the database service node, and assign group sending tasks to the master control node and each child node according to the user quantity information;

the master control and each child node are configured to access, through the database service node connected with the master control node and each child node respectively, the storage equipments connected with the database service node, and read, according to the group sending tasks of the master control node and each child node respectively, subscription relationships of the scheduled telecommunication capability product and content/content set of the subscription relationships of the scheduled telecommunication capability product respectively;

the master control and each child node are further configured to send the subscription relationships and the content/content set read by the master control node and each child node respectively to a message center, and send the subscription relationships and the content/content set obtained by the master control node and each child node respectively to users through the message center.

Alternatively, each database service node is connected with each other, in the case that any database service node is interacting with the storage equipment and an exception happens, a database service node performs operation of load balancing or switching on failure with another database service node connected with the database service node.

To summarize, the technical solution mentioned above sets a corresponding database service node for the master control node and each child node respectively, and the master control node and each child node may access storage equipments through the database service node, which increases the database access speed and avoids the problem of database's resources shortage and improves service performance of the telecommunication capability group sending.

BRIEF DESCRIPTION OF THE ACCOMPANYING DRAWINGS

DETAILED DESCRIPTION OF THE EMBODIMENTS

Figure 1:
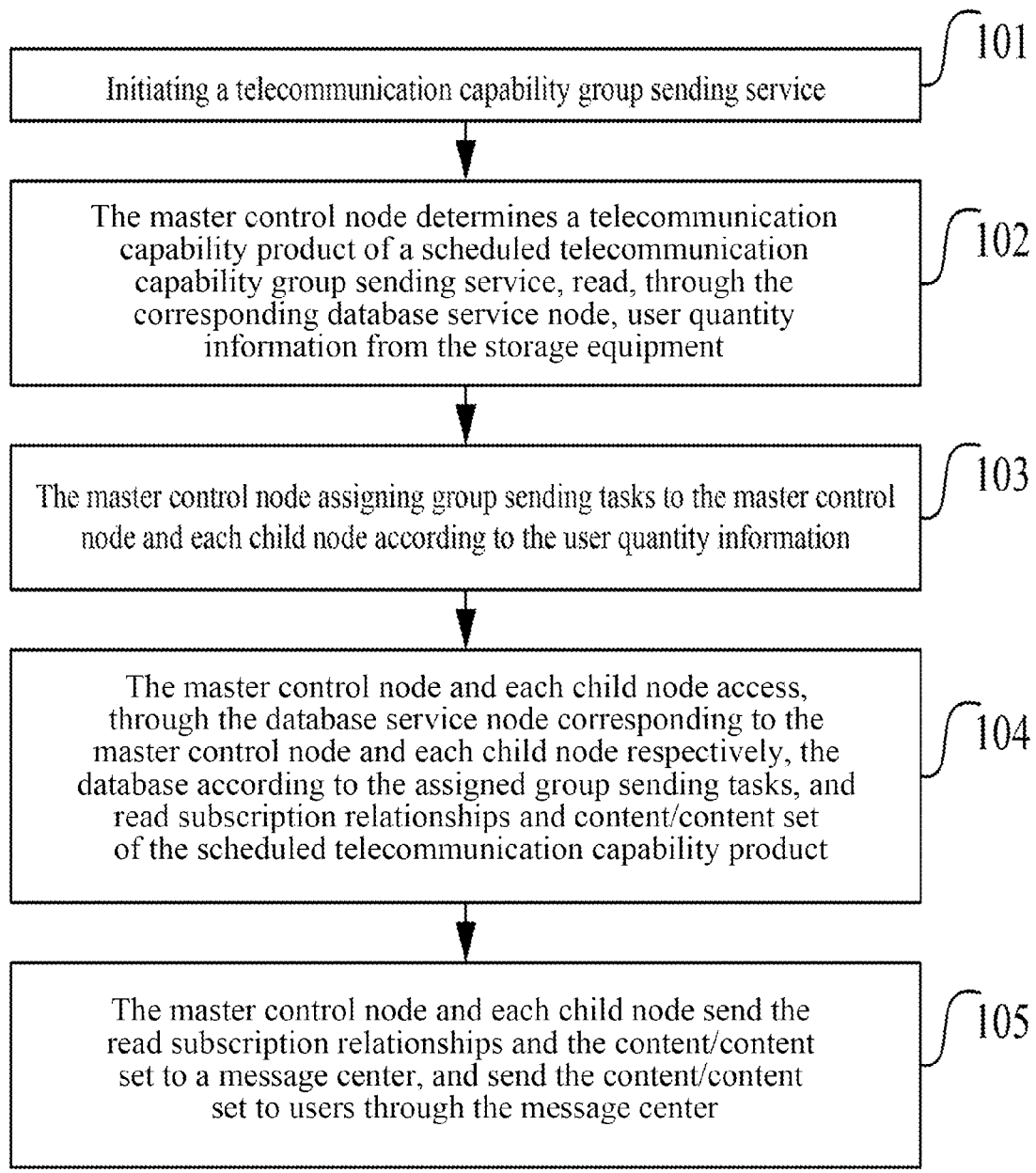
FIG. 1 is a flow chart of a method for carrying out telecommunication capability group sending according to the embodiments of the present document.

In embodiments of the present document, each node of a system for carrying out telecommunication capability group sending corresponds to a database service node, and a plurality of database service nodes perform load balancing or switching on failure within themselves and each node may quickly read the subscription relationships and send messages to users, therefore, the overall processing capability of the application cluster is enhanced.

The system of the embodiments of invention comprises one or more application clusters, and the application cluster comprises a master control node and a plurality of child nodes. In the case of executing tasks, the master control node reads user quantity information from the database and then assigns group sending tasks to itself and various child nodes. The master control node and child nodes interact with the storage equipments of the database cluster through corresponding database service node, and read subscription relationships and content/content set from the database. Each node of the application cluster of the embodiments of the present document corresponds to a database service node, and if scenarios occurs such as the load pressure of the database service node is too high or the database service node hangs up, then the switching on failure is performed to switch to a database service node which bear less load pressure, thus the master control node and each child node continue to read the subscription relationships and content/content set. Therefore, the problem of processing capability bottleneck of the database is avoided and using a plurality of application clusters to correspond to a plurality of database service nodes to read the same database enhances the ability to process tasks.

The embodiments of the present document will be described hereinafter in detail in conjunction with the drawings thereof. It should be noted that the embodiments of the present document and features in the embodiments may be arbitrarily combined with each other if there is no conflict.

A method for carrying out telecommunication capability group sending in the present document, the method is applied in a system carrying out telecommunication capability group sending, and the system comprises a application cluster and a database cluster, the application cluster comprises a master control node and child nodes connected with the master control node, and the database cluster comprises a plurality of database service nodes and storage equipments connected with each database service node, and the master control node is connected with a corresponding database service node and each child node is connected with a corresponding database service node, the method comprising:

the master control node determining a telecommunication capability product of a scheduled telecommunication capability group sending service, reading, through the corresponding database service node, user quantity information of the scheduled telecommunication capability product from the storage equipment, and assigning group sending tasks to the master control node and each child node according to the user quantity information;

the master control node and each child node interacting, through the database service node corresponding to the master control node and each child node respectively, with the storage equipments according to the group sending tasks of the master control node and each child node respectively, and reading subscription relationships of the scheduled telecommunication capability product and content/content set of the scheduled telecommunication capability product; and the master control node and each child node sending the read subscription relationships and content/content set to a message center, and sending the content/content set to users through the message center.

Alternatively, in the system carrying out telecommunication capability group sending, various database service nodes are connected with each other.

The method further comprises:

in the case that the database service node is interacting with the storage equipment and an exception happens, other database service nodes connected with the database service node performing the operation of load balancing or switching on failure.

Alternatively, the master control node and each child node reading the subscription relationships of the scheduled telecommunication capability product, comprising:

the master control node and each child node read user information according to the group sending tasks of the master control node and each child node respectively, the user information comprising user identification.

Alternatively, the user information further comprises one or more of VIP user information, white list user information and black list user information.

The master control node and each child node sending the read subscription relationships and content/content set to a message center, comprising: the master control node and each child node determining the content/content set which is sent preferentially and/or not sent according to one or more of the VIP user information, the white list user information and the black list user information comprised in the user information, and sending the user identification and the content/content set to the message center.

Alternatively, the master control node and child nodes comprise a first-level scheduling controller cache and a second-level scheduling controller cache, and the master control node and child nodes interact with the storage equipments, the second-level scheduling controller cache reads data from the storage equipment while the first-level scheduling controller cache reads data from the second-level scheduling controller cache.

Alternatively, a device for carrying out telecommunication capability group sending comprises a content obtaining unit and a sending unit, wherein:

the content obtaining unit is used to interact with the storage equipments through the corresponding database service nodes according to group sending tasks, read subscription relationships of a scheduled telecommunication capability product and read content/content set of the scheduled telecommunication capability product;

the sending unit is used to send the subscription relationships and the content/content set read by the content obtaining unit to a message center, and send the subscription relationships and the content/content set to users through the message center.

Alternatively, the device further comprises a task assignment unit, wherein:

the task assignment unit is used to determine the telecommunication capability product of the scheduled telecommunication capability group sending service, read user quantity information of the scheduled telecommunication capability product from the storage equipments through corresponding database service nodes, and assign group sending tasks to the device and nodes connected with the device according to the user quantity information.

Alternatively, the content obtaining unit is specifically used to read user information according to the group sending tasks, and the user information belongs to the users who subscribe to the scheduled telecommunication capability product, and the user information comprises user identification.

The user information further comprises one or more of VIP user information, white list user information and black list user information;

the sending unit is further configured to determine the content/content set which is sent preferentially and/or not sent according to one or more of the VIP user information, the white list user information and the black list user information comprised in the user information, and send the user identification and the content/content set to the message center.

Alternatively, A system for carrying out telecommunication capability group sending comprises: an application cluster and a database cluster, wherein the application cluster comprises a master control node and child nodes connected with the master control node, and the database cluster comprises a plurality of database service nodes and storage equipments connected with each database service node, and the master control node is connected with a corresponding database service node and the child node is connected with a corresponding database service node, wherein:

the master control node determines a telecommunication capability product of a scheduled telecommunication capability group sending service, reads, through the corresponding database service node, user quantity information of the scheduled telecommunication capability product from the storage equipment, and assign group sending tasks to the master control node and each child node according to the user quantity information;

the master control node and each child node interact, through the corresponding database service node respectively, with the storage equipments according to the group sending tasks of the master control node and each child node respectively, and read subscription relationships of the scheduled telecommunication capability product and content/content set of the scheduled telecommunication capability product;

the master control and each child node send the read subscription relationships and content/content to a message center, and send the content/content set to users through the message center.

Alternatively, various database service nodes are connected with each other, and when the database service node is interacting with the storage equipment and an exception happens, other database service nodes connected with the database service node performing the operation of load balancing or switching on failure.

The method for carrying out telecommunication capability group sending of embodiments of the present document is applied in a system carrying out telecommunication capability group sending. The system comprises an application cluster and database cluster, and the application cluster comprises a master control node and a plurality of child nodes connected with the master control node. The master control node manages and controls the child nodes, and the child nodes report their status to the master control node at regular time. The database cluster comprises a plurality of database service nodes and storage equipments connected with each database service node, and the master control node is connected with a database service node and each child node is connected with a database service node. Wherein the number of child nodes maybe one or multiple. The processing capability is twofold if there exists one child node, since there is one master control node and one child node. The processing capability is fivefold if there exists four child nodes, since there is one master control node and four child nodes.

As shown in FIG. 1, the method for carrying out telecommunication capability group sending of embodiments of the present document comprises:

Step 101: the telecommunication capability group sending service is started;

In the step 101 of embodiments of the present document, the telecommunication capability group sending service is initiated at a fixed time. In the case that it comes to the time point to initiate, the scheduling policy is initiated immediately. The scheduling policy is used to control the executing process of the telecommunication capability group sending service. The scheduling policy comprises one-time scheduling policy or periodic scheduling policy. One-time scheduling policy will not be initiated again once the one-time scheduling policy is completely performed. Periodic scheduling policy may be repeatedly performed to schedule the telecommunication capability group sending service.

Step 102: The master control node determines a telecommunication capability product of a scheduled telecommunication capability group sending service, read, through the database service node connected with the master control node, user quantity information of the scheduled telecommunication capability product from the storage equipment connected with the database service node.

The master control node read the user quantity information of the scheduled telecommunication capability product, i.e., the number of users who subscribe to the telecommunication capability product.

Step 103: the master control node assigns group sending tasks to itself and each child node according to the user quantity information of the telecommunication capability product.

The master control node may assign the group sending tasks evenly.

After the master control node obtains the user quantity information, it assigns the number of users to itself and each child node which are in charge of users. The master control node and each child node read subscription relationships content/content of the scheduled telecommunication capability product according to the number of users under the charge of the master control node and the each child node.

Two-level scheduling controller caches are configured in the master control node and child nodes. A second-level scheduling controller cache reads data from the database while the first-level scheduling controller cache reads data from the second-level scheduling controller cache. In this way, the throughput of the application is improved. In the case that the data volume of the second-level scheduling controller cache is below a threshold value, the second-level scheduling controller cache reads the database immediately to ensure the data volume of the first-level scheduling controller cache, therefore, sufficient data is provided for the telecommunication capability group sending.

Step 104: the master control node and each child node access, through the database service node connected with the master control node and each child node respectively, the database connected with the database service node according to the assigned group sending tasks of the master control node and each child node respectively, and read subscription relationships and content/content set of the scheduled telecommunication capability product.

In the case that the tasks of the master control node and child nodes are determined, the master control node and child nodes read, through their respective database service nodes, user information respectively according to their respective group sending tasks. The user information belongs to the users who subscribe to the scheduled telecommunication capability product, which comprises user identification, VIP user information, white list user information and black list user information and the like.

If scenarios such as overload or instability of the network happen, various database service nodes may perform the operation of load balancing or switching on failure with each other. The whole task will not be affected in the case that a certain node can not send content because of a breakdown of a certain database service node, thus, to complete the telecommunication capability group sending in a given time of a sending down peak time is ensured.

Step 105: the master control node and each child node send the read subscription relationships and the content/content set to a message center (such as the multimedia messaging service center), and send the subscription relationships and the content/content set to users through the message center.

The master control node and each child node determine the content/content set which is sent preferentially and/or not sent according to one or more of the VIP user information, the white list user information and the black list user information comprised in the user information, and send the user identification and the content/content set to the message center. The message center sends the content/content set to users according to user identification.

Figure 2:
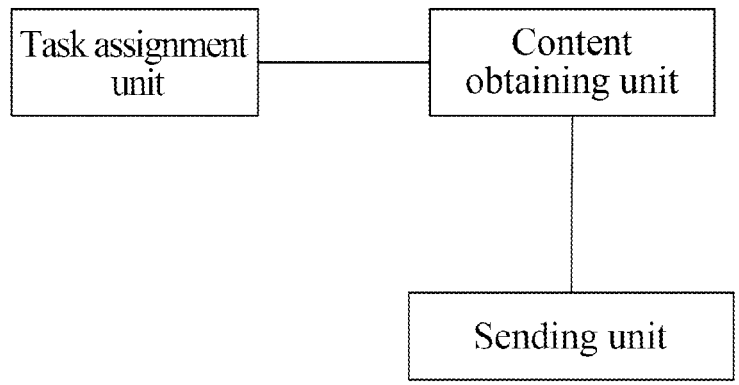
FIG. 2 is a structure diagram of a device for carrying out telecommunication capability group sending according to the embodiments of the present document.

As show in FIG. 2, the embodiments of the present document further provide a device for carrying out telecommunication capability group sending. The device comprises: a content obtaining unit 201 and a sending unit 202, wherein:

the content obtaining unit 201 is configured to interact with the storage equipments through the corresponding database service nodes according to group sending tasks, read subscription relationships and content/content set of a scheduled telecommunication capability product;

the sending unit 202 is configured to send the subscription relationships and the content/content set read by the content obtaining unit 201 to a message center, and send the subscription relationships and the content/content set to users through the message center.

The device further comprises a task assignment unit 203, wherein:

the task assignment unit 203 is configured to determine the telecommunication capability product of the scheduled telecommunication capability group sending service, and read quantity information of the scheduled telecommunication capability product from the storage equipments through the corresponding database service nodes, and assign group sending tasks to the device and nodes connected with the device according to the user quantity information.

The content obtaining unit 201 is further configured to read user information according to the group sending tasks. The user information belongs to the users who subscribe to the scheduled telecommunication capability product, and comprises user identification.

The user information further comprises one or more of VIP user information, white list user information and black list user information.

The sending unit 202 is further configured to determine the content/content set which is sent preferentially and/or not sent according to one or more of the VIP user information, the white list user information and the black list user information comprised in the user information, and send the user identification and the content/content set to the message center.

Figure 3:
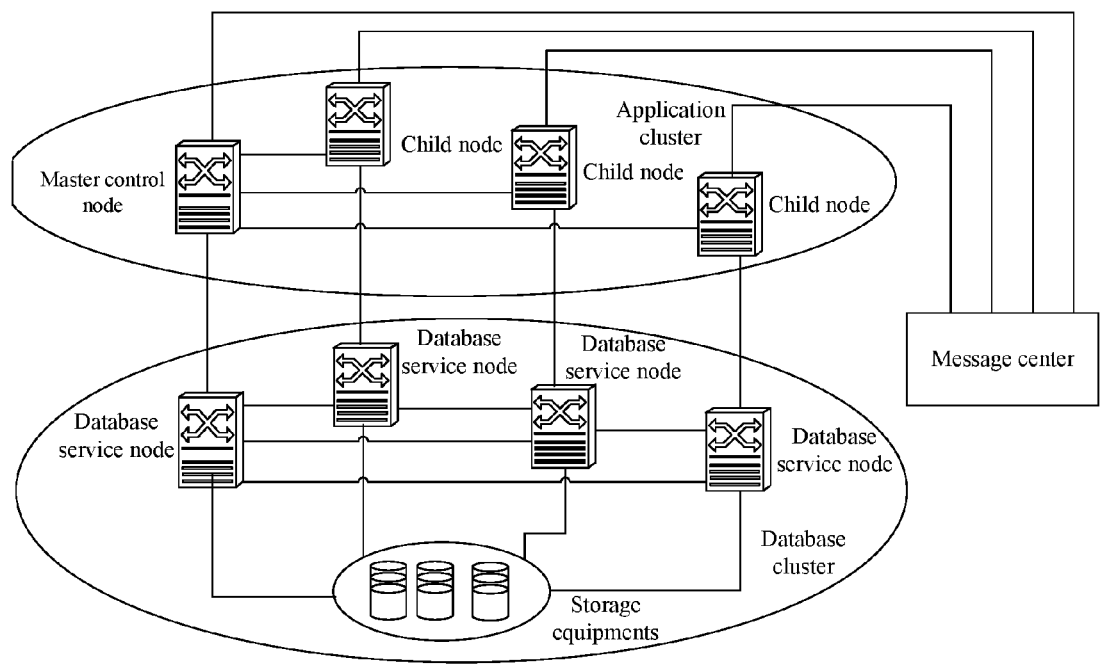
FIG. 3 is a structure diagram of a system for carrying out telecommunication capability group sending according to the embodiments of the present document.

As shown in FIG. 3, the embodiments of the present document further provide a system for carrying out telecommunication capability group sending. The system comprises an application cluster and a database cluster. The application cluster comprises a master control node and child nodes connected with the master control node. The database cluster comprises a plurality of database service nodes and storage equipments connected with each database service node. The master control node is connected with a database service node and each child node is connected with a database service node, wherein:

the master control node determines a telecommunication capability product of a scheduled telecommunication capability group sending service, and reads, through the corresponding database service node, user quantity information of the scheduled telecommunication capability product from the storage equipment, and assigns group sending tasks to the master control node and each child node according to the user quantity information.

The master control node and each child node interact with, through the database service node corresponding to the master control node and each child node respectively, the storage equipments, and read subscription relationships of the scheduled telecommunication capability product and content/content set of the scheduled telecommunication capability product.

The master control node and each child node send the read subscription relationships and the content/content set to a message center, and send the content/content set to users through the message center.

Each database service node is connected with each other, in the case that any database service node is interacting with the storage equipment and an exception happens, other database service nodes connected with the database service node perform the operation of load balancing or switching on failure.

Those skilled in the art understand that all or part of the processes of the abovementioned method could be implemented through relevant hardware instructed by programmable codes. The programmable could be stored in the computer-readable medium, such as read-only memory, a magnetic disk or an optical disc and the like. Alternatively, all or part of the processes of the abovementioned embodiments could be implemented by one or more integrated circuits. Accordingly, the module or element of the abovementioned embodiments could be implemented by hardware or by software functional modules. The present document is not limited to any specific combination of hardware and software.

It should be noted that the present document could have many other embodiments. Those skilled in the art could make various corresponding modifications and variations according to the present document without deviating from the spirit and the essence of the present document, while these corresponding modifications and variations should fall within the protection scope of appended claims of the present document.

INDUSTRIAL APPLICABILITY

The aforementioned technical solution sets corresponding database service node for the master control node and each child node respectively, and the master control node and each child node may access the storage equipments through database service nodes, which increases the database access speed and avoids the problem of database's resources shortage and improve the service performance of the telecommunication capability group sending. Therefore, the present document has a strong industrial applicability.

What is claimed is:

1. A method for carrying out telecommunication capability group sending, which is applied in a system carrying out telecommunication capability group sending, the system comprising an application cluster and a database cluster, the application cluster comprising a master control node and child nodes connected with the master control node, the database cluster comprising a plurality of database service nodes and storage equipments connected with each database service node, the master control node being connected with a database service node and each child node being connected with a database service node, the method comprising:
- the master control node determining a telecommunication capability product of a scheduled telecommunication capability group sending service, and reading, through the database service node connected with the master control node, user quantity information of a scheduled telecommunication capability product from the storage equipment connected with the database service node, and assigning group sending tasks to the master control node and each child node according to the user quantity information;
- the master control node and each child node accessing, through database service nodes connected with the master control node and each child node respectively, the storage equipments connected with the database service nodes, and reading, according to group sending tasks of the master control node and each child node respectively, subscription relationships of the scheduled telecommunication capability product and content/content set of the subscription relationships of the scheduled telecommunication capability product respectively; and
- the master control node and each child node sending the subscription relationships and content/content set read by the master control node and each child node respectively to a message center, and sending the subscription relationships and the content/content set obtained by the master control node and each child node respectively to users through the message center.

2. The method for carrying out telecommunication capability group sending according to claim 1, wherein:
- various database service nodes are connected with each other in the system carrying out telecommunication capability group sending; and
- the method further comprises:
- in the case that the database service nodes are accessing the storage equipment connected with the database service node, if an exception happens, database service nodes connected with the database service node performing an operation of load balancing or switching on failure.

3. The method for carrying out telecommunication capability group sending according to claim 1, wherein the master control node and each child node accessing, through database service nodes connected with the master control node and each child node respectively, storage equipments connected with the database service node, and reading, according to the group sending tasks of the master control node and each child node respectively, subscription relationships of the scheduled telecommunication capability product and content/content set respectively comprises:
- the master control node and each child node read user information according to the group sending tasks of the master control node and each child node respectively, and the user information comprising user identification of users who subscribe to the scheduled telecommunication capability product.

4. The method for carrying out telecommunication capability group sending according to claim 3, wherein:
- the user information further comprises one or more of VIP user information, white list user information and black list user information; and
- the master control node and each child node sending the subscription relationships and the content/content set read by the master control node and each child node respectively to a message center comprises: the master control node and each child node determining content/content set which is sent preferentially and/or not sent according to one or more of the VIP user information, the white list user information and the black list user information comprised in the user information, and sending the user identification and the content/content set to the message center.

5. The method for carrying out telecommunication capability group sending according to claim 1, wherein:
- the master control node and each child node comprise a first-level scheduling controller cache and a second-level scheduling controller cache; and
- the method further comprises: in the case that the master control node and each child node interact with the storage equipments, the second-level scheduling controller cache reading data from the storage equipment while the first-level scheduling controller cache reading data from the second-level scheduling controller cache.

6. A device for carrying out telecommunication capability group sending, which is connected with database service nodes, and the database service nodes being connected with storage equipments, the device comprising: a content obtaining unit and a sending unit, wherein:
- the content obtaining unit is configured to interact with the storage equipments through the database service nodes, read subscription relationships of a scheduled telecommunication capability product according to group sending tasks of the device and read content/content set of the scheduled telecommunication capability product;
- the sending unit is configured to send the subscription relationships and the content/content set read by the content obtaining unit to a message center, and send the subscription relationships and the content/content set to users through the message center;
- wherein the content obtaining unit is configured to read subscription relationships of a scheduled telecommunication capability product according to group sending tasks of the device and read content/content set of the scheduled telecommunication capability product as follows:
- reading user information according to the group sending tasks of the device, the user information comprising user identification of users who subscribe to the scheduled telecommunication capability product;
- the user information further comprising one or more of VIP user information, white list user information and black list user information; and
- the sending unit further being configured to determine the content/content set which is sent preferentially and/or not sent according to one or more of the VIP user information, the white list user information and the black list user information comprised in the user information, and send the user identification and the content/content set to the message center.

7. The device for carrying out telecommunication capability group sending according to claim 6, the device further comprising a task assignment unit, wherein:
- the task assignment unit is configured to determine the telecommunication capability product of a scheduled telecommunication capability group sending service, read user quantity information of the scheduled telecommunication capability product from the storage equipments through the database service nodes, and assign group sending tasks to the device and nodes connected with the device according to the user quantity information.

8. A system for carrying out telecommunication capability group sending, comprising: an application cluster and a database cluster, the application cluster comprising a master control node and child nodes connected with the master control node, the database cluster comprising a plurality of database service nodes and storage equipments connected with each database service node, the master control node being connected with a database service node and each child node being connected with a database service node, wherein:

the master control node is configured to determine a telecommunication capability product of a scheduled telecommunication capability group sending service, and read, through the database service node connected with the master control node user, user quantity information of the scheduled telecommunication capability product from the storage equipment connected with the database service node, and assign group sending tasks to the master control node and each child node according to the user quantity information;

the master control and each child node are configured to access, through database service nodes connected with the master control node and each child node respectively, the storage equipments connected with the database service nodes, and read, according to group sending tasks of the master control node and each child node respectively, subscription relationships of the scheduled telecommunication capability product and content/content set of the subscription relationships of the scheduled telecommunication capability product respectively; and the master control node and each child node are further configured to send the subscription relationships and content/content set read by the master control node and each child node respectively to a message center, and send the subscription relationships and the content/content set obtained by the master control node and each child node respectively to users through the message center.

9. The system for carrying out telecommunication capability group sending according to claim 8, wherein: each database service node is connected with each other, in the case that any database service node is interacting with the storage equipment, if an exception happens, database service nodes connected with the database service node perform an operation of load balancing or switching on failure.

* * * * *